March 20, 1945.  C. E. SMITH  2,372,129
ELECTRONIC TIMING CONTROL
Filed Feb. 18, 1943
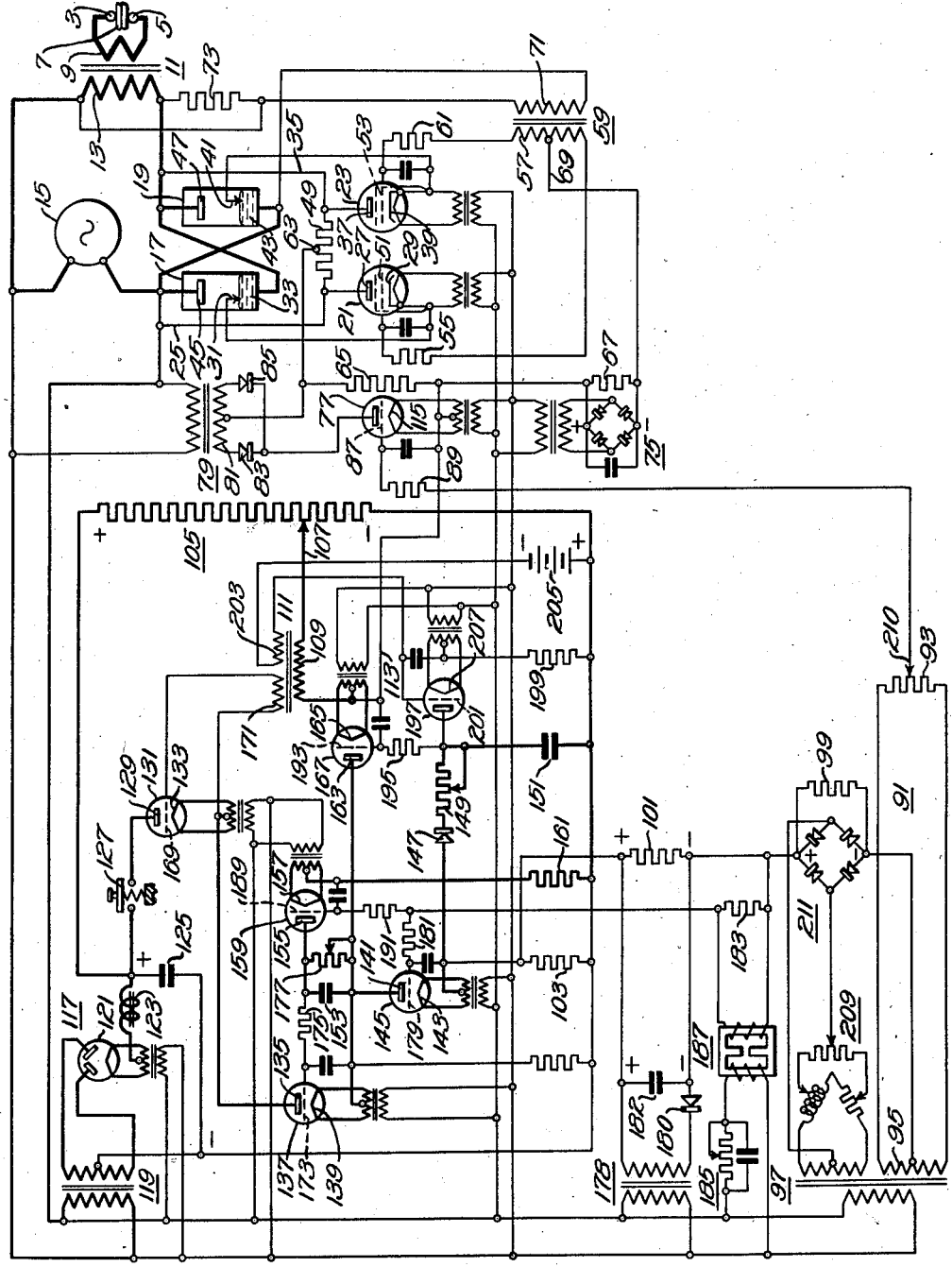
WITNESSES:
Robert C. Baird
John K. Shipman
INVENTOR
Clyde E. Smith.
BY
Hymen Diamond
ATTORNEY Patented Mar. 20, 1945

2,372,129

UNITED STATES PATENT OFFICE 2,372,129

ELECTRONIC TIMING CONTROL

Clyde E. Smith, Warren, Ohio, assignor to Westinghouse Electric & Manufacturing Company, East Pittsburgh, Pa., a corporation of Pennsylvania Application February 18, 1943, Serial No. 476,309

11 Claims. (Cl. 250—27)

This invention relates to an electronic timing control and has particular relation to a system for supplying current from a source to a load through electric discharge devices.

In resistance welding apparatus constructed in accordance with the teachings of the prior art, current is supplied to the welding transformer from an alternating-current source through a pair of inversely connected ignitrons which are controlled by an electronic timing system. Desirable welds may be produced by controlling the ignitrons so that welding current is supplied in a series of spaced impulses, each impulse enduring for a predetermined number of half periods of the source with an interval of another predetermined number of half periods between successive impulses. The length of an impulse, which is hereinafter designated the on-time interval, as well as the length of the interval between successive impulses, hereinafter designated the off-time interval, must be adjustable over a wide range to permit welding of materials having diverse characteristics. The instant in each half period of the on-time interval at which the corresponding ignitron is rendered conductive is also adjustable to regulate the amount of heat developed in the material at the point of the weld. In addition, it is advantageous to initiate each on-time interval at an instant in a period of the source corresponding to the power factor of the load; thus insuring the supply of welding current for the entire number of half periods desired.

To accomplish the several functions, a system has been employed which is somewhat similar to that disclosed in the application of Finn H. Gulliksen, Serial No. 271,951, filed May 5, 1939, issued as Patent 2,303,453 on December 1, 1942, and assigned to the Westinghouse Electric & Manufacturing Company. The prior system, although generally satisfactory in operation, includes a large number of electric discharge devices and their associated control circuits. Thus, the manufacture of the apparatus is expensive, and the number of points at which failure might occur is rather large. It follows that the cost of maintenance and repair is also high.

It is, accordingly, an object of my invention to provide new and inexpensive apparatus for supplying current from a source to a load in which the current is supplied in a series of spaced impulses.

Another object of my invention is to provide a new and improved electronic timing control for resistance welding apparatus.

A further object of my invention is to provide a reliable electronic timing control for measuring on-time and off-time intervals in the supply of current to a load which employs a minimum number of electric discharge devices and their associated control circuits.

More specifically, it is an object of my invention to provide apparatus for supplying current from a source to a load which includes a simplified electronic control system whereby the current is supplied in spaced impulses, each impulse consisting of a predetermined number of half periods of the source with another predetermined number of half periods between successive impulses.

In accordance with the illustrated embodiment of my invention, a pair of capacitors are charged simultaneously from a direct current source through electronic valve means comprising a plurality of electric discharge devices. These devices include a high vacuum discharge device and another device of the arc-like type in series with each other and connected so that all the current for charging said capacitors passes therethrough. The control circuits of both the discharge devices are normally arranged to permit them to conduct current if the remainder of the circuit through the devices is complete. When the charge on the first of the capacitors attains a preselected magnitude, an impulse is impressed in the control circuit of the high vacuum device to render it momentarily non-conductive and stop the flow of current. Thereafter, the potential on the second capacitor is effective in the control circuit of the discharge device of the arc-like type to prevent it from becoming conductive as long as the potential is above a predetermined magnitude. A discharge circuit is provided for each capacitor, the discharge circuit for said second capacitor including adjustable means to determine the rate of discharge of the second capacitor. When the potential on said second capacitor drops below the predetermined magnitude, both devices are again in condition to conduct current if the remainder of the circuit therethrough is complete.

In addition to the high vacuum device and the device of the arc-like type, two other discharge devices of the arc-like type are provided, one for each capacitor. The first capacitor and its corresponding device are in series with each other but in parallel with the second capacitor and its corresponding series connected device. These parallel circuits are, of course, in series with the source of direct current the high vacuum device and the first device of the arc-like type. The discharge devices corresponding to the capacitors are normally maintained non-conductive but an impulse is impressed in the control circuits thereof tending to render them conductive at an instant in each period of the alternating source of welding current corresponding to the power factor angle of the load. Thus, whenever both the high vacuum device and the first device of the arc-like type are in condition to become conductive, they become conductive when the devices corresponding to the capacitors are rendered conductive at the instant in the next period corresponding to the power factor angle.

The firing circuits of the ignitrons are interconnected with the charging circuit for the first capacitor so that the ignitrons conduct current during the period in which the first capacitor is being charged and do not conduct while the first capacitor is not being charged. Thus, the on-time interval is determined by the rate of charge of the first capacitor and the off-time interval is determined by the rate of discharge of the second capacitor.

The novel features that I consider characteristic of my invention are set forth with particularity in the appended claims. The invention itself, however, both as to its organization and its method of operation, together with additional objects and advantages thereof will best be understood from the following description of a specific embodiment when read in connection with the accompanying drawing, in which the single figure is a diagrammatic view showing the specific embodiment of my invention.

In the apparatus as shown in the drawing, a pair of welding electrodes 3 and 5 engage the material 7 to be welded and are connected across the secondary 9 of a welding transformer 11. The primary 13 of the welding transformer is supplied with power from a source of alternating-current potential 15 through a pair of inversely-connected ignitrons 17 and 19. A pair of electric discharge valves 21 and 23, preferably thyratrons, which are hereinafter designated as firing valves, are arranged to control the ignition of the ignitrons 17 and 19. The ignition circuit for one of the ignitrons 17 extends from one side of the source 15 through a conductor 25, the anode 27 and cathode 29 of the firing valve 21, the igniter 31 and cathode 33 of the ignitron 17 and the primary 13 of the welding transformer to the other side of the source. The ignition circuit of the other ignitron 17 may be traced from the other side of the source 15 through the primary 13 of the welding transformer, a conductor 35, the anode 37 and cathode 39 of the firing valve 23, the igniter 41 and cathode 43 of the ignitron 19 to the other side of the source.

It is to be noted that the anode 27 of firing valve 21 is always of the same polarity as the anode 45 of the corresponding ignitron 17, and the anode 37 of firing valve 23 is of the same polarity as the anode 47 of ignitron 19. Thus, when a firing valve becomes conductive, ignition of the corresponding ignitron is effected. When an ignitron becomes conductive, the ignition circuit through the corresponding firing valve is short-circuited by the discharge path through the ignitron, and the firing valve is rendered nonconductive. The ignitron then becomes non-conductive at the end of the half-period of the source potential in which it was ignited.

The anodes 27 and 37 of the firing valves 21 and 23 are interconnected by a resistor 49. The grid 51 of one firing valve 21 is connected to the grid 53 of the other firing valve 23 in a circuit extending through a grid resistor 55, a secondary 57 of an auxiliary transformer 59, and another grid resistor 61. The center tap 63 of the resistor 49 interconnecting the anodes of the firing valves is connected through a pair of resistors 65 and 67 to the center tap 69 of the secondary 57 of the auxiliary transformer 59. The control circuit of the firing valve 21 may then be traced from its grid 51 through the grid resistor 55 and a portion of the secondary 57 to the center tap 69 and thence through the resistors 67 and 65 to the center tap 63 of the resistor 49. The control circuit then continues from one end of the resistor 49 through the conductor 35, the cathode 33 and the igniter 31 of the ignitron 17 to the cathode 29 of the firing valve 21. The control circuit of the other firing valve 23 may be traced from grid 53 through resistor 61, a portion of secondary 57, resistors 67 and 65, a portion of resistor 49, conductor 25, cathode 43 and igniter 41 of ignitron 19 to the cathode 39 of the valve.

An alternating potential derived from the source 15 appears across the resistor 49 interconnecting the anodes of the firing valves. To eliminate the influence of this alternating potential from the control circuits of the valves 21 and 23, the primary 71 of the auxiliary transformer 59 is connected oppositely across the source 15. Thus the potential appearing across the secondary 57 of the auxiliary transformer 59 balances out the potential appearing across the resistor 49 interconnecting the anodes of the firing valves. A resistor 73 is connected across the primary of the welding transformer to absorb current surges and prevent backfire of the ignitrons.

It is apparent that the two resistors 65 and 67 are common to the control circuits of both firing valves 21 and 23. A direct-current biasing potential is impressed across the resistor 67 from an auxiliary source 75. This biasing potential is of such polarity and magnitude as to normally maintain the firing valves non-conductive.

The other resistor 65 is connected in series with another electric discharge valve 77 in an auxiliary circuit. The valve 77 is preferably a thyratron and is designated hereinafter as the control valve. Another auxiliary transformer 79 is energized from the alternating-current source, and its secondary 81 is connected in circuit with control valve 77 and resistor 65 through a pair of rectifiers 83 and 85. The arrangement is such that a rectified alternating-current potential is thereby impressed in the auxiliary circuit. When the control valve 77 becomes conductive, current flows through the resistor 65 in series therewith until the end of the half-period of the alternating-current potential, at which time the anode-cathode potential of the control valve reaches zero and the valve ceases to conduct. The current flowing through the resistor 65 develops a potential thereacross of such polarity and magnitude as to counteract the biasing potential across the resistor 67 in the control circuits of the firing valves. The particular firing valve whose anode is positive at the instant the control valve becomes conductive, is then rendered conductive to effect ignition of the corresponding ignitron.

The control circuit for the control valve 77 may be traced from the grid 87 thereof through a grid resistor 89, a balancing bridge 91 including a resistor 93 and the secondary 95 of an auxiliary transformer 97, and resistors 99, 101 and 103 to the negative terminal of a voltage divider 105. The control circuit continues from an intermediate tap 107 on the divider 105 through the primary 109 of an impulse transformer 111 and a conductor 113 to the cathode 115 of the control valve 77. A direct-current potential is impressed across the terminals of the divider 105 from an auxiliary source 117 comprising a transformer 119, a rectifier 121 and filtering elements 123 and 125. As will become apparent hereinafter, the resultant potential in the control circuit of the control valve 77 is normally of such polarity and magnitude as to make the grid 87 highly negative with respect to the cathode 115.

A push-button switch 127 is arranged to connect the positive terminal of the divider 105 to the anode 129 of an electric discharge device 131 of the high-vacuum type. The cathode 133 of the device 131 is connected to the anode 135 of a second electric discharge device 137 of the arc-like type, preferably a thyratron. The cathode 139 of the second device 137 is connected to a negative point on the divider through three paths. The first of these paths may be traced from the cathode 139 of the second device 137 through the anode 141 and cathode 143 of a third electric discharge device 145 of the arc-like type, a rectifier 147, a potentiometer 149, and a capacitor 151 to the negative terminal of the divider 105. The second path may be traced from the cathode 139 of the second device through a second capacitor 153, the anode 155 and cathode 157 of a third discharge device 159 of the arc-like type, and a resistor 161 to the negative terminal of the divider 105. A third path may be traced from the cathode 139 of the second device 137 through the anode 163 and cathode 165 of a fourth discharge device 167 of the arc-like type, and the primary 109 of the transformer 111 to the intermediate tap 107 on the divider.

The grid 169 of the first discharge device 131 is connected to the cathode 133 through a secondary 171 of the transformer 111. As current does not normally flow through the primary 109 of the transformer 111, the first device 131, which is of the high-vacuum type, is in condition to conduct current if the remainder of the circuit is complete.

The control circuit of the second discharge device 137 extends from the grid 173 through a grid resistor 175 and the second capacitor 153 to the cathode 139. An adjustable resistor 177 is connected across the second capacitor 153 so that the capacitor is originally in a discharged condition. Thus, there is a zero potential between the grid 173 and cathode 139 of the second discharge device 137, and, as this device is of the arc-like type, it is in condition to become conductive if the remainder of the circuit is complete.

The control circuit of the third discharge device 145 extends from the grid 179 through a grid resistor 181 and resistors 183 and 101 to the cathode 143. A direct-current potential is impressed across the resistor 101 through transformer 178, rectifier 180 and capacitor 182. This potential is of such polarity as to maintain the third device non-conductive. However, a potential impulse is impressed across the second resistor 183 from the alternating-current source 15 through a phase shifting circuit 185 and an impulse transformer 187. The phase shifting circuit 185 is adjusted so that an impulse of such magnitude and polarity as to counteract the potential across resistor 101 occurs at an instant in each period of the source corresponding to the power factor angle of the load. When the impulse across resistor 183 is sufficient to overcome the biasing potential of the first resistor 101, the third device 145 is rendered conductive if the remainder of the circuit is complete. As the first and second devices 131 and 137 are in condition to become conductive, the first impulse across the second resistor 183 of such polarity as to oppose the potential across resistor 101 following the closing of the push-button switch 127 causes the first, second, and third devices to become conductive. Current then flows from the divider 105 through the first, second, and third devices to charge the first capacitor 151 in series therewith at a rate determined by the setting of the potentiometer 149.

The control circuit of the fourth discharge device 159 extends from the grid 189 through a grid resistor 191 and resistors 183, 101, 103 and 161 to the cathode 157. As the potential in the control circuit of the fourth device 159 is the same as that in the control circuit of the third device, they are rendered conductive simultaneously. Thus current also flows from the divider 105 through the first, second, and fourth devices and the second capacitor 153 in series therewith.

The control circuit of the fifth discharge device 167 extends from the grid 193 through a grid resistor 195, the first capacitor 151 to the negative terminal of the divider 105 and from the intermediate tap 107 through the primary 109 of the transformer 111 to the cathode 165. The potential impressed in this control circuit by the portion of the divider included therein tends to maintain the fifth device non-conductive. However, when the charge on the first capacitor 151 attains a preselected magnitude, the capacitor potential counteracts the biasing potential supplied from the divider 105 and renders the fifth device 167 conductive. Current then flows from the divider 105 through the first, second, and fifth devices and the primary 109 of the transformer 111 in series therewith. However, the duration of this current is quite short, for the flow thereof through the primary 109 impresses a potential impulse between the grid 169 and cathode 133 of the first device 131 through secondary 171 to render it momentarily non-conductive. As a result, the second, third, fourth and fifth devices also become non-conductive.

As soon as the potential impulse impressed in the control circuit of the first device 131 through the secondary 171 of the transformer 111 expires, the second, third, and fourth devices would again become conductive except for the fact that the second capacitor 153 is included in the control circuit of the second device 137. The second capacitor 153 is charged simultaneously with the first capacitor 151, and the polarity thereof is such that the second device 137 is prevented from becoming conductive as long as the charge on the second capacitor 153 is above a predetermined magnitude. The predetermined magnitude depends upon the critical potential characteristic of the particular discharge device employed and the anode potential impressed thereon. With a Westinghouse KU627 thyratron and approximately 300 volts anode potential, the device becomes conductive when the grid potential is more positive than −5 volts. It is apparent that the first, third, fourth, and fifth devices cannot become conductive until the second device is in condition to conduct current. The second capacitor 153 is discharged at a predetermined rate through the adjustable resistor 177. Then as soon as the potential of the second capacitor 153 is below the predetermined magnitude, the second device 137 is conditioned to conduct current and does so when the next counteracting impulse is impressed on resistor 183 in the control circuit of the third device 145.

A sixth discharge device 197 of the arc-like type is connected in series with a resistor 199 across the first capacitor 151. The control circuit of the sixth device 197 extends from the grid 201 through another secondary 203 of the transformer 111, a source of direct-current potential 205 such as a battery, and the resistor 199 to the cathode 207. The potential source 205 maintains the sixth device 147 normally non-conductive. However, when the fifth device 167 becomes conductive, the current impulse impressed in the control circuit of the sixth device 197 through the transformer 111 renders the latter conductive to discharge the first capacitor 151. The discharge of the first capacitor 151 is, of course, accomplished before the second device 137 is again in condition to become conductive.

As previously mentioned, the biasing potential supplied to the control circuit of the control valve 77 by the divider 105 and resistor 101 is sufficient to counteract the other potential across resistor 99 in the control circuit to maintain the grid 87 highly negative with respect to the cathode 115. A second phase shifting circuit 209 is energized from the source through the auxiliary transformer 97. The potential derived therefrom is rectified by the rectifier system 211 and impressed across the resistor 99. The direction of rectification is such that the potential appearing across the resistor 99 has the wave form of an inverted rectified alternating potential with respect to the grid 87 of control valve 77. The setting of the second phase shifting circuit 209, of course, determines the phase position of the positive peak of the inverted rectified alternating potential appearing across the resistor 99. This setting as will be explained hereinafter determines the instant in each half period at which the control valve 77 is rendered conductive.

When the first, second, and third devices are non-conductive, the potential impressed in the control circuit of control valve 77 by the divider 105 and resistor 101 is sufficiently negative to prevent the peaks of the potential across resistor 99 from raising the resultant potential above the critical potential necessary to render the control valve conductive. When the first, second, and third devices become conductive, the upper terminal of the resistor 103 is effectively connected to the positive terminal of the divider 105 to render the grid 87 of the control valve 77 less negative. The magnitudes of the various potentials are such that the peaks of the resultant potential in the control circuit of the control valve 77 then rise above the critical potential of the control valve at an instant in each half period of the source determined by the setting of the second phase shifting circuit 209. When the third device 145 again becomes non-conductive, the potential in the control circuit of the control valve 77 again becomes highly negative to prevent the valve from becoming conductive.

The balance potentiometer 91 ordinarily does not impress a potential in the control circuit of control valve 77. However, if the starting characteristics of the ignitrons 17 and 19 should differ, an alternating component may be introduced in the control circuit of the control valve by shifting the tap 210. Shifting the tap 210 causes the control valve to become conductive slightly earlier in one half-period than in the other and thus takes care of the difference in the starting characteristics of the ignitrons.

To initiate a welding operation, the push-button switch 127 is closed. When the next counteracting potential impulse is impressed in the control circuit of the third device 145, the first, second, third, and fourth devices 131, 137, 145 and 159 become conductive. The resultant potential in the control circuit of the control valve 77 rises above the critical potential of the valve at a predetermined instant in each half period of the source to render the valve conductive. The corresponding ignitron in each half period then conducts current to the welding transformer beginning at the predetermined instant in the half period. After a predetermined interval of time determined by potentiometer 149, the charge on the first capacitor 151 attains the preselected magnitude to render the fifth device 167 conductive. This time interval is the on-time interval.

When the fifth device becomes conductive, the first device 131 is momentarily rendered non-conductive to halt the flow of current through the second, third, fourth and fifth devices. Thereafter, the second device 137 is prevented from again becoming conductive by the charge on the second capacitor 153. After a predetermined time interval, the charge on the second capacitor 153 is reduced to permit the second device 137 to conduct current. This time interval is the off-time interval for as long as the second device 137 remains non-conductive, the potential in the control circuit of the control valve 77 is such that the valve is maintained non-conductive.

While the second capacitor 153 is discharging through the adjustable resistor 177, the first capacitor 151 is completely discharged through the sixth device 197 which is rendered conductive through the transformer 111 in series with the fifth device 167. The sixth device 197, of course, becomes non-conductive when the first capacitor 151 is discharged to a potential just below the arc-drop of the device.

When the second device is again in condition to become conductive the next counteracting impulse in the control circuit of the third device again renders the first, second, third and fourth devices conductive.

From the foregoing, it is apparent that the ignitrons 17 and 19 are rendered conductive alternately at a predetermined instant in each half period of the source for a predetermined number of half periods comprising the on-time interval. The ignitrons are then prevented from conducting current for a predetermined number of half periods comprising the off-time interval. The on-time and off-time intervals are then repeated as long as the push-button switch 127 remains closed.

Although I have illustrated and described the apparatus as specifically adapted for use as a seam welder, it is obvious that the timing system may be used for other apparatus in which such control is desired.

Although I have shown and described a specific embodiment of my invention, I am fully aware that many modifications thereof are possible. My invention, therefore, is not to be restricted except insofar as is necessitated by the prior art and the spirit of the appended claims.

I claim as my invention:

1. For use in supplying current from a source to a load, the combination comprising valve means for controlling the flow of current to the load, a pair of capacitors, means for simultaneously charging said capacitors at predetermined rates, means responsive to a charge of a preselected magnitude on one of said capacitors for momentarily halting operation of said charging means, said charging means tending to become reoperative thereafter, means effective after said momentary halting to prevent reoperation of said charging means while the charge on the other capacitor is above a predetermined magnitude, means for discharging said other capacitor at a preselected rate after said momentary halting of said charging means, and means for controlling said valve means in accordance with whether said charging means is operative or inoperative.

2. For use in supplying current from a source to a load, the combination comprising first valve means for controlling the flow of current to the load, a pair of capacitors, means including second normally conductive electronic valve means for supplying current to simultaneously charge said capacitors at predetermined rates, means responsive to a charge of a preselected magnitude on one of said capacitors for rendering said second valve means momentarily non-conductive, means responsive to the charge on the other capacitor for thereafter preventing said second valve means from becoming conductive while the charge on the other capacitor is above a predetermined magnitude, means for discharging said other capacitor at a preselected rate after said second valve means are first rendered non-conductive, and means for controlling said first valve means in accordance with whether or not said second valve means are conductive.

3. In combination, a source of direct-current potential, a first electric discharge device of the high vacuum type, a second electric discharge device of the arc-like type in series with said first device and said source, first control means for said first device arranged to permit it to conduct current, second control means for said second device arranged to permit it to conduct current, a pair of capacitors connected to be charged simultaneously at predetermined rates by current flowing from said source through said devices, means associated with said first control means and responsive to a charge of a preselected magnitude on one of said capacitors to render said first device momentarily non-conductive, means associated with said second control means for preventing said second device from becoming conductive while the charge on the other capacitor is above a predetermined magnitude, and means for discharging said second capacitor at a preselected rate after said first device is rendered non-conductive.

4. In combination, a source of direct-current potential, a first electric discharge device of the high-vacuum type, a second electric discharge device of the arc-like type in series with said first device and said source, a first control circuit for said first device normally arranged to permit it to conduct current, a second control circuit for said second device normally arranged to permit it to conduct current, means for initiating a flow of current from said source through said devices, a capacitor connected to be charged at a predetermined rate by the current flowing through said devices, means associated with said first control circuit and operable a predetermined time after initiation of said current flow to render said first device momentarily non-conductive, said capacitor being connected in said second control circuit in such manner as to prevent said second device from becoming conductive while the charge on said capacitor is above a preselected magnitude, and means for discharging said capacitor at a predetermined rate after said first device is rendered non-conductive.

5. In combination, a source of direct-current potential, a first electric discharge device of the high-vacuum type, a second electric discharge device of the arc-like type, a third electric discharge device of the arc-like type, said three devices being connected in series with each other and said source, first control means for said first device normally arranged to permit it to conduct current, second control means for said second device normally arranged to permit it to conduct current, third control means for said third device including biasing means normally tending to maintain it non-conductive, means for overcoming said biasing means to render said third device conductive whereby current is conducted through said three devices, means associated with said first control means and operable a predetermined time after said third device becomes conductive to render said first device momentarily non-conductive and thereby render said second and third devices non-conductive, and means associated with said second control means for preventing said second device from again becoming conductive for a predetermined time after said first device is rendered non-conductive.

6. In combination, a source of direct-current potential, a first electric discharge device of the high-vacuum type, a second electric discharge device of the arc-like type in series with said first device, a first control circuit for said first device normally arranged to permit it to conduct current, a second control circuit for said second device normally arranged to permit it to conduct current, a pair of capacitors connected to be charged simultaneously at predetermined rates by current flowing from said source through said devices, a third electric discharge device of the arc-like type, conducting means connecting said third device in series with said first and second devices, a third control circuit for said third device including one of said capacitors arranged to render said third device conductive when the charge on said one capacitor attains a preselected magnitude, means associated with said first control circuit and responsive to current flowing through said third device for rendering said first device non-conductive, whereby said second and third devices become non-conductive, the other of said capacitors being connected in said second control circuit to prevent said second device from becoming conductive while the charge on said other capacitor is above a preselected magnitude, and means for discharging said other capacitor at a fixed rate after said first device is rendered non-conductive.

7. In combination, a source of direct-current potential, normally conductive electronic valve means in series with said source, a capacitor connected through rectifying means to said valve means to be charged at a predetermined rate by current supplied from said source through said valve means, an electric discharge device of the arc-like type connected in series with said valve means but in parallel circuit relation with said capacitor and rectifying means, a control circuit for said device including said capacitor arranged to render said device conductive when the charge on said capacitor attains a predetermined magnitude, means responsive to current flowing through said device to render said valve means non-conductive, second means responsive to current flowing through said device for discharging said capacitor, and means for preventing said valve means from becoming conductive for a predetermined time after it is rendered non-conductive.

8. In combination, a source of direct-current potential, normally conductive electronic valve means in series with said source, a capacitor connected through rectifying means to said valve means to be charged at a predetermined rate by current supplied from said source through said valve means, an electric discharge device of the arc-like type connected in series with said valve means but in parallel circuit relation with said capacitor and rectifying means, a control circuit for said device including said capacitor arranged to render said device conductive when the charge on said capacitor attains a predetermined magnitude, means responsive to current flowing through said device to render said valve means non-conductive, a discharge circuit for said capacitor including a second electric discharge device of the arc-like type, second means responsive to current flowing through said first device for rendering said second device conductive, and means for preventing said valve means from becoming conductive for a predetermined time after it is rendered non-conductive.

9. In combination, a source of direct-current potential, a first electric discharge device of the high-vacuum type, a second electric discharge device of the arc-like type in series with said first device and said source, a first control circuit for said first device normally arranged to permit it to conduct current, a second control circuit for said second device normally arranged to permit it to conduct current, a capacitor connected in a series circuit with rectifying means and said first and second devices to be charged at a predetermined rate by current flowing from said source through said devices, a third electric discharge device of the arc-like type connected in series with said first and second devices but in parallel circuit relation with said capacitor and rectifying means, a control circuit for said third device including said capacitor arranged to render said third device conductive when the charge on said capacitor attains a predetermined magnitude, means responsive to current flowing through said third device to render said first device momentarily non-conductive and thereby render said second device non-conductive, second means responsive to current flowing through said third device for discharging said capacitor, and means for preventing said second device from becoming conductive for a predetermined time after it is rendered non-conductive.

10. In combination, a source of direct-current potential, a first electric discharge device of the high-vacuum type, a second electric discharge device of the arc-like type, a third electric discharge device of the arc-like type, said three devices being connected in series with each other and said source, first control means for said first device normally arranged to permit it to conduct current, second control means for said second device normally arranged to permit it to conduct current, third control means for said third device including biasing means normally tending to maintain it non-conductive, means for overcoming said biasing means to render said third device conductive whereby current is conducted through said three devices, a capacitor connected in series with said devices to be charged at a predetermined rate by the current flowing therethrough, means associated with said first control means and responsive to a charge of a predetermined magnitude on said capacitor to render said first device momentarily non-conductive whereby said second and third devices are rendered non-conductive, and means associated with said second control means for preventing said second device from becoming conductive for a predetermined time after said first device is rendered non-conductive.

11. For use in supplying current from a first source of periodically pulsating potential to a load, the combination comprising valve means for controlling the flow of current to the load, a second source of direct-current potential, a first electric discharge device of the high-vacuum type, a second electric discharge device of the arc-like type, a third electric discharge device of the arc-like type, said three devices being connected in series with each other and said second source, a first control circuit for said first device normally arranged to permit it to conduct current, a second control circuit for said second device normally arranged to permit it to conduct current, a third control circuit for said third device including biasing potential means normally maintaining it non-conductive, means for impressing a potential impulse in said third control circuit at a preselected instant in each period of said first source which is effective to overcome said biasing potential and render said third device conductive whereby current is conducted through all three devices, means associated with said first control circuit and operable a predetermined time after said third device becomes conductive to render said first device momentarily non-conductive and thereby render said second and third devices non-conductive, means associated with said second control circuit for preventing said second device from becoming conductive for a predetermined time after said first device is rendered non-conductive, and means for controlling said valve means in accordance with whether said third device is conductive or non-conductive.

CLYDE E. SMITH.